United States Patent
Watanabe

(10) Patent No.: US 9,462,493 B2
(45) Date of Patent: Oct. 4, 2016

(54) BASE STATION APPARATUS, BASE STATION CONTROL METHOD, AND BASE STATION CONTROL SYSTEM DETERMINING INCREASES/DECREASES AND REPLACEMENT OF FUNCTIONAL BLOCKS

(71) Applicant: FUJITSU LIMITED, Kawasaki-shi, Kanagawa (JP)

(72) Inventor: Teruyoshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/161,633

(22) Filed: Jan. 22, 2014

(65) Prior Publication Data

US 2014/0287742 A1 Sep. 25, 2014

(30) Foreign Application Priority Data

Mar. 25, 2013 (JP) .................. 2013-063083

(51) Int. Cl.
*H04W 24/00* (2009.01)
*H04W 24/04* (2009.01)
*H04W 88/08* (2009.01)

(52) U.S. Cl.
CPC .......... *H04W 24/04* (2013.01); *H04W 88/08* (2013.01)

(58) Field of Classification Search
None
See application file for complete search history.

(56) References Cited

U.S. PATENT DOCUMENTS

| | | |
|---|---|---|
| 2003/0224777 A1 | 12/2003 | Sakuma |
| 2005/0208948 A1* | 9/2005 | Hori ............ H04W 76/02 455/452.1 |
| 2013/0287001 A1* | 10/2013 | Sahlin et al. ........... 370/330 |

FOREIGN PATENT DOCUMENTS

| | | |
|---|---|---|
| JP | 2003-347998 | 12/2003 |
| JP | 2006-20143 A | 1/2006 |
| JP | 2009-135731 A | 6/2009 |
| JP | 2010-056999 | 3/2010 |
| JP | 2011-101104 A | 5/2011 |

OTHER PUBLICATIONS

Japanese Office Action mailed Jul. 19, 2016 for corresponding Japanese Patent Application No. 2013-063083, with Partial English Translation, 5 pages.

\* cited by examiner

*Primary Examiner* — Martin Mushambo
(74) *Attorney, Agent, or Firm* — Fujitsu Patent Center

(57) ABSTRACT

A base station apparatus includes plural functional blocks made up of hardware and formed according to function; and a processor that that is configured to determine based on an input/output state of a control signal and of user data performed by the functional blocks and a state of data processing, an increase/decrease or a replacement of the functional blocks and output a determination result to an external destination.

9 Claims, 11 Drawing Sheets

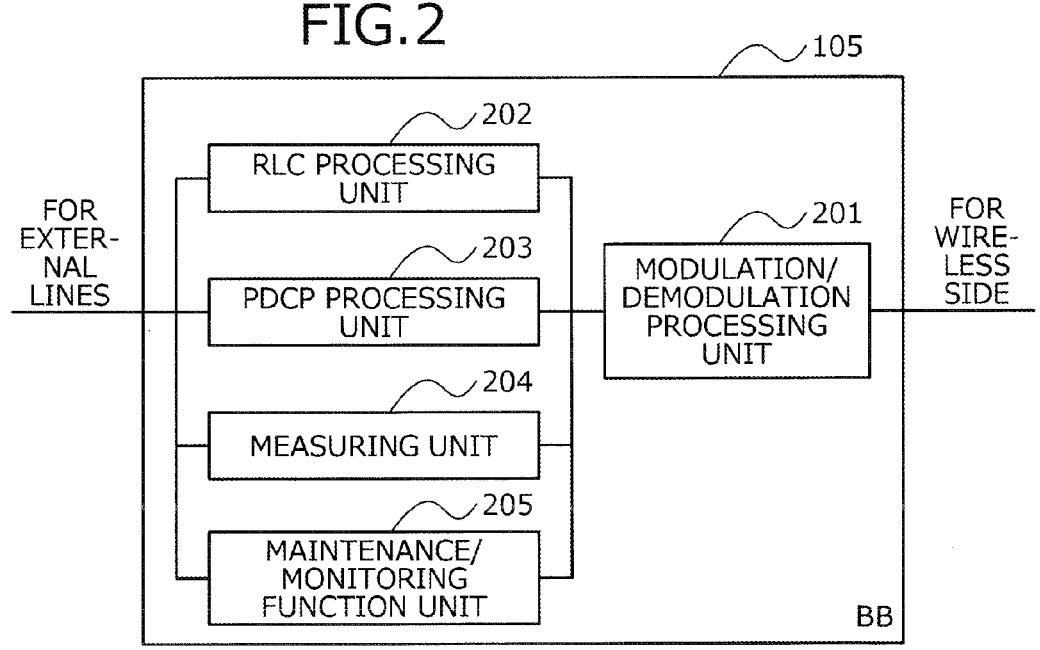
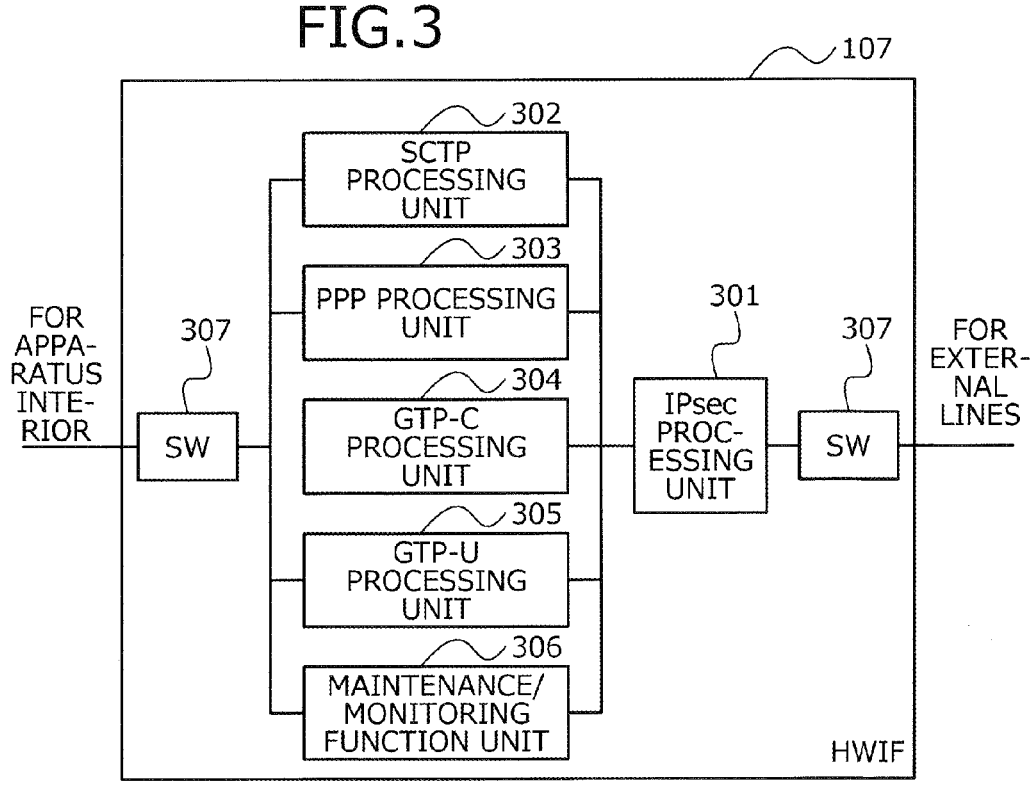

FIG.8

| ITEM NUMBER | GENERIC NAME | DESCRIPTION |
|---|---|---|
| 1 | CELL RESOURCE | RESOURCE USED BY CELL: THIS RESOURCE INFORMATION IS USED FOR MANAGING NUMBER OF USERS THAT CAN BE ACCOMMODATED IN CELL. |
| 2 | COMMON CHANNEL RESOURCE | RESOURCE USED BY COMMON CHANNEL. RESOURCE CAN BE MANAGED ACCORDING TO TYPE OF COMMON CHANNEL USED BY eNB. THIS RESOURCE INFORMATION IS USED FOR MANAGING WHETHER COMMON CHANNEL CAN BE ALLOCATED. |
| 3 | INDIVIDUAL CHANNEL RESOURCE | RESOURCE USED BY INDIVIDUAL CHANNEL. RESOURCE CAN BE MANAGED ACCORDING TO TYPE OF INDIVIDUAL CHANNEL USED BY eNB. THIS RESOURCE INFORMATION IS USED FOR MANAGING WHETHER INDIVIDUAL CHANNEL CAN BE ALLOCATED. |
| 4 | LOGICAL CHANNEL RESOURCE | RESOURCE USED BY RADIO BEARER ALLOCATED TO INDIVIDUAL CHANNEL. THIS RESOURCE INFORMATION IS USED FOR MANAGING WHETHER RADIO BEARER CAN BE ALLOCATED TO USER. |
| 5 | BB MEASUREMENT RESOURCE | RESOURCE USED FOR WIRELESS MEASUREMENT PERFORMED IN BB. RESOURCE EXISTS FOR EACH ITEM OF MEASUREMENT PERFORMED IN eNB. THIS RESOURCE INFORMATION IS USED FOR MANAGING WHETHER WIRELESS MEASUREMENT RESOURCE CAN BE ALLOCATED. |
| 6 | HWIF RESOURCE | RESOURCE USED AT TIME OF SETUP OF INTER-STATION CONTROL LINE. THIS RESOURCE INFORMATION IS USED FOR MANAGING WHETHER HWIF USED BY IP LINE BETWEEN OWN eNB AND COUNTERPART NODE CAN BE USED. |

FIG.9

| SYSTEM BANDWIDTH | UE COUNT/CELL |
|---|---|
| 5 MHz | ○○ UEs |
| 10 MHz | □□ UEs |
| 15 MHz | △△ UEs |
| 20 MHz | ×× UEs |

FIG.10

| RESOURCE TYPE | RESOURCE COUNT |
|---|---|
| SCTP | ○○ ASSOCIATION COUNT |
| IPsec | □□ CONCURRENT CONNECTION COUNT |
| GTP-U | △△ TE-ID COUNT |
| PPP | ×× CONCURRENT CONNECTION COUNT |

FIG.11

| ITEM NUMBER | ITEM | DETAILS OF ITEM |
|---|---|---|
| 1 | MEMORY CARD REPLACEMENT | MONITORING OF MAXIMUM NUMBER OF TIMES WRITING IN ONE BLOCK IN DATA STORAGE MEMORY CARD IS PERFORMED |
| 2 | FREE-RUNNING FREQUENCY STABILITY ADJUSTMENT | MONITORING ELAPSE OF OCXO |
| 3 | TEMPERATURE SENSING | MONITORING OF POSSIBILITY OF FAILURE, FROM REPORTED VALUE OF TEMPERATURE SENSOR BUILT INTO APPARATUS |
| 4 | ECC ERROR SENSING | MONITORING OF COMPONENT DEGRADATION, FROM ERROR COUNT OF ECC FUNCTION OF INTERNAL MEMORY OF DSP AND CPU |

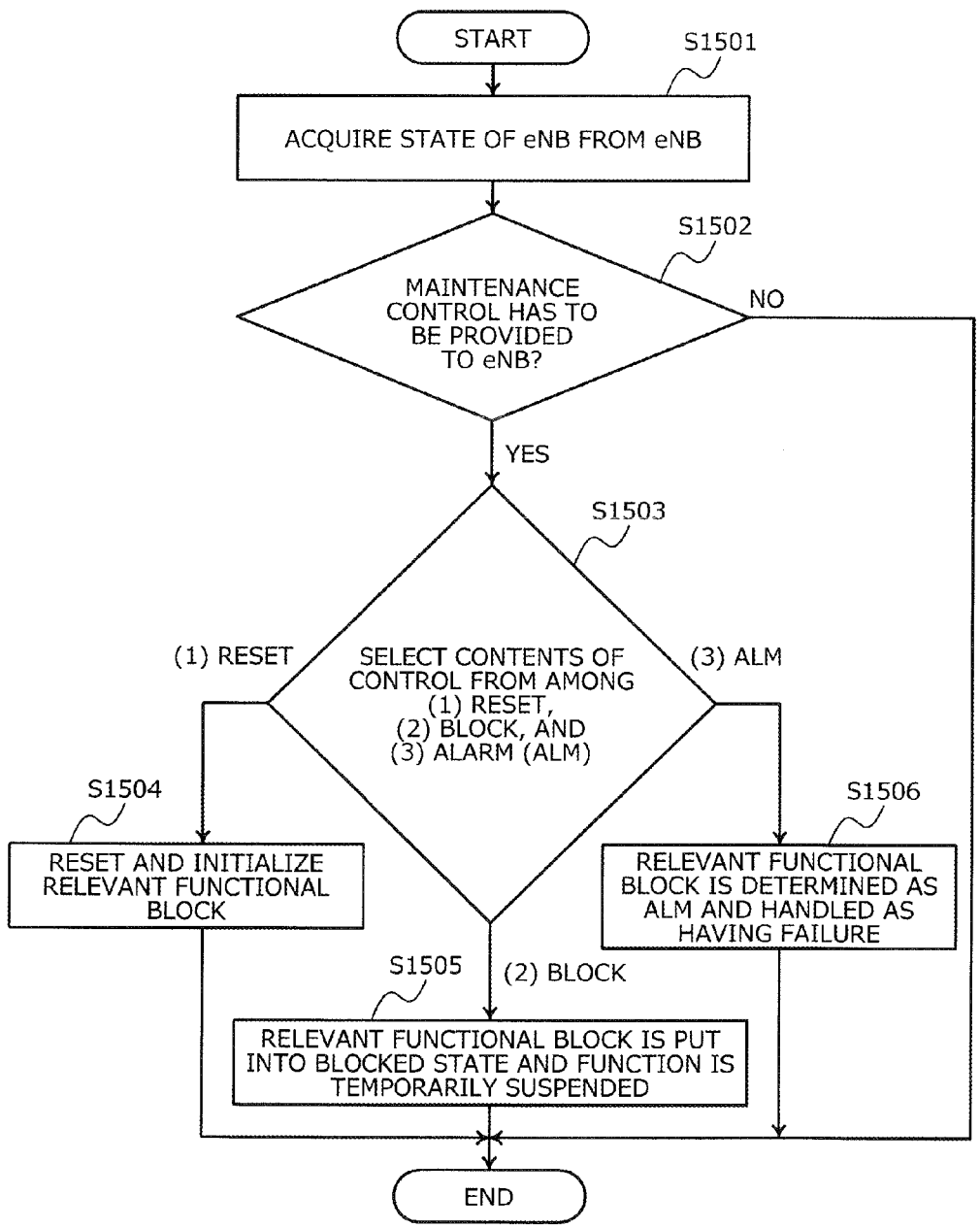

BASE STATION APPARATUS, BASE STATION CONTROL METHOD, AND BASE STATION CONTROL SYSTEM DETERMINING INCREASES/DECREASES AND REPLACEMENT OF FUNCTIONAL BLOCKS

CROSS REFERENCE TO RELATED APPLICATIONS

This application is based upon and claims the benefit of priority of the prior Japanese Patent Application No. 2013-063083, filed on Mar. 25, 2013, the entire contents of which are incorporated herein by reference.

FIELD

The embodiments discussed herein are related to a base station apparatus, a base station control method, and a base station control system that determine increases/decreases and replacement of functional blocks therein.

BACKGROUND

With regard to communication between base station apparatuses, for example, a next generation wireless mobile communication system (LTE) establishes interfaces between apparatuses called an S1 interface and an X2 interface to perform communication. A base station apparatus (eNB) making up the wireless communication system connects to a higher-level apparatus, i.e., an MME/Serving-GW apparatus, by using IP protocol. A maintenance terminal (hereinafter, operation equipment (OPE)) providing maintenance control to the base station apparatus is connected via the S1 interface.

If system resources run short in the base station apparatus due to an increase/decrease in traffic etc., the base station apparatus notifies the OPE of the shortage of the resources. However, since this notification is made after depletion of the resources, communication services of the carrier (telecommunications carrier) are significantly affected, for example, an inability to perform expected call setup during the occurrence of a resource shortage may arise. If a failure occurs at a base station apparatus, the call setup, etc. cannot be performed due to the failure, resulting in an inability to continue and the termination of necessary services, significantly affecting the communication services of the carrier.

Therefore, the base station uses a self-monitoring function to monitor system resource shortages and the occurrence of failures at regular cycles. The base station reports to the OPE, traffic information, the data amount, and the occurrence of alarms and errors of the apparatus at each cycle to reduce the problem of service termination.

For example, for multiple wireless communication modems included in a base station apparatus, the occurrence of failure at a wireless communication modem is determined from the number of abnormal frames in reception frames during wireless communication and, when the number of faulty wireless communication modems reaches a certain number or more, a maintenance person is notified of a replacement message via a control station in a proposed technique (see. e.g., Japanese Laid-Open Patent Publication No. 2003-347998). In a proposed technique, when a cell becomes unable to continue service due to a failure, etc., a wireless control apparatus is notified of the inability to set the cell so that call setup of the cell from the base station apparatus is prevented (see. e.g., Japanese Laid-Open Patent Publication No. 2010-56999).

However, even when the monitoring function is used, conventional techniques have the following problems (1), (2), etc.

(1) Information reported by a base station apparatus to an OPE at a constant cycle is simple information such as the number of ACKs and NACKs and no report is made on the registration status of mobile stations (UEs), a service state (such as phone calls and email) of the UEs, etc. Therefore, no analysis is performed through correlation of the UE state according to period corresponding to the numbers of ACKs and NACKs and a status of an assigned service. Further, when a problem occurs, even if the cause of the problem is attempted to be determined from excess/shortage of the reported information value, only a direct cause is determined and truly necessary control cannot be selected for the base station apparatus. For example, if a CPU usage rate of the base station apparatus is collected, the presence of a high load can be known from the CPU usage rate; however, it is not known what factor caused the high load.

(2) Since a failure of a base station apparatus is reported after occurrence of the failure, service may be stopped at the time of the report. If the OPE gives a preliminary prediction, multiple service termination factors must be monitored in a short cycle. However, since this leads to the deployment (transfer) of a large amount of user information over a network, the network load and the processing load of the OPE increase along with a risk of personal information leaks and therefore, the overall system may be adversely affected.

SUMMARY

According to an aspect of an embodiment, a base station apparatus includes plural functional blocks made up of hardware and formed according to function; and a processor that that is configured to determine based on an input/output state of a control signal and of user data performed by the functional blocks and a state of data processing, an increase/decrease or a replacement of the functional blocks and output a determination result to an external destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram of an internal configuration example of a baseband processing unit;

FIG. 3 is a diagram of an internal configuration example of a highway interface unit;

FIG. 8 is a chart of call process resources;

FIG. 9 is a chart of cell resource setup information;

FIG. 10 is a chart of HWIF resources;

FIG. 11 is a chart of items enabling advance failure prediction;

FIG. 15 is a flowchart of process contents of control provided by the OPE.

DESCRIPTION OF EMBODIMENTS

A preferred embodiment will be described in detail with reference to the accompanying drawings. A base station apparatus of the embodiment determines the presence/absence of an abnormal state and notifies an OPE of a determination result. The determination of the abnormal state is made based on information such as an alarm supplied to the OPE, as well as information held only in the base station apparatus and not typically reported to the OPE, such as control information from C-Plane received by the base station. The base station makes a preliminary prediction of an abnormal state.

To make the preliminary prediction, multiple service termination factors are monitored in a short cycle. If the OPE is notified of information each time as in the case of a conventional function, the network load adversely affects an overall system and therefore, the base station performs monitoring to make a determination. Because of a function of combining multiple parameters retained in the base station apparatus to determine a state change from multiple viewpoints, information is supplied that enables a maintenance person to suitably deal with an occurring problem, etc. The base station apparatus has an independent hardware configuration (hereinafter referred to as a functional block) basically for each functional unit or each group of strongly-related functional units. By increasing or decreasing functional blocks, functions can be added or deleted. At the time of failure, a functional block can be replaced to restore a function.

Figure 1A:
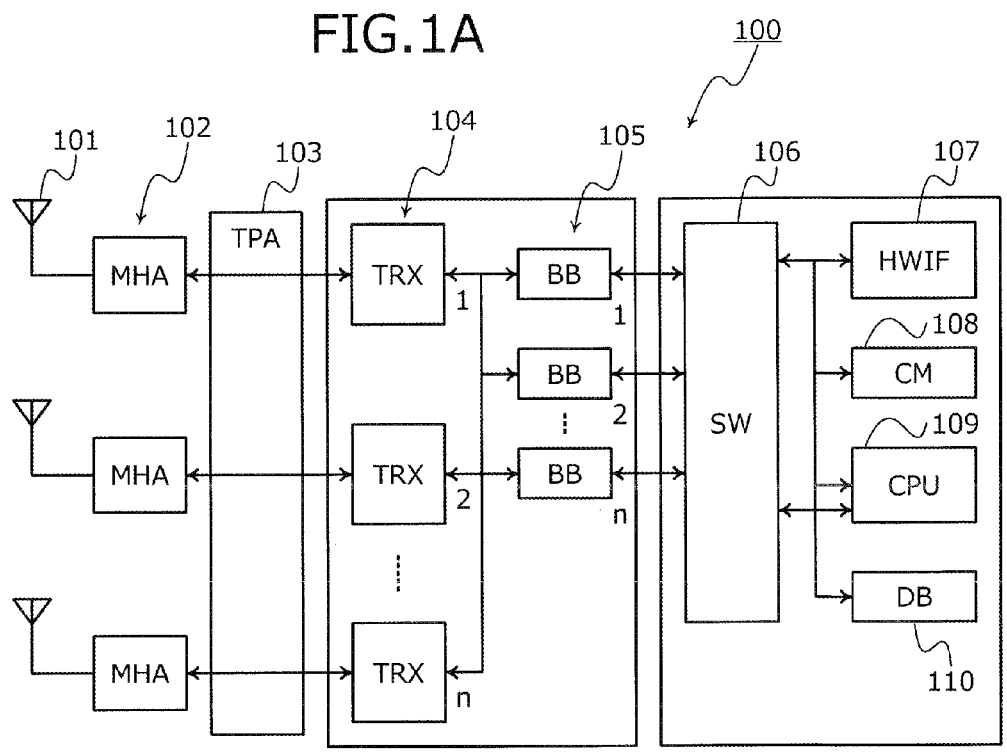
FIG. 1A is a diagram of an internal configuration of a base station apparatus according to an embodiment.

FIG. 1A is a diagram of an internal configuration of a base station apparatus according to the embodiment. A base station apparatus 100 includes an antenna 101, a preamplifier (mast head Amplifier (MHA)) 102, and a power amplifier (transmit power amplifier (TPA)) 103. The base station apparatus 100 also includes a transceiving unit (transmitter/receiver (TRX)) 104, and a baseband processing unit (baseband unit (BB)) 105. The base station apparatus 100 also includes a switch (SW) 106, a highway interface unit (highway interface (HWIF)) 107, a common memory (CM) 108, a call control processor (CPU) 109, and a database (database unit (DB)) 110.

The base station apparatus 100 uses the antenna 101 to transmit and receive data with respect to a mobile station (UE). A configuration including the antenna 101, the preamplifier 102, and the transceiving unit 104 has a transmission function and a reception function. The highway interface unit 107 is used for the transmission and reception of data with respect to a high-level access gateway, and the transmission and reception of data through a logical path.

The call control processor 109 has a function of a control unit that controls the units of the base station apparatus 100. Data transmitted from the high-level access gateway to a mobile station is transferred from the highway interface unit 107 to the baseband processing unit 105. The data is then transmitted via the transceiving unit 104, the power amplifier 103, and the preamplifier 102 from the antenna 101 to the mobile station. Data from the mobile station is transmitted through the reverse path to the access gateway.

The base station apparatus 100 transfers U-Plane data between the baseband processing unit 105 and the highway interface unit 107. The CPU 109 determines a wireless state and gives instructions to the baseband processing unit 105 so as to ensure the optimal wireless state. The CPU 109 performs cabled setup for the highway interface unit 107. The base station apparatus 100 has a functional block made up of the CPU 109, the highway interface unit 107, and the baseband processing unit 105. To achieve improvements in performance or the restoration from a failure of the base station apparatus 100, these functional blocks (such as the CPU 109, the highway interface unit 107, and the baseband processing unit 105) are increased/decreased or replaced.

In this embodiment, the base station apparatus 100 acquires information related to the wireless side with the baseband processing unit 105. The highway interface unit 107 acquires information related to the wired side. The baseband processing unit 105 and the highway interface unit 107 transmit the acquired information to the CPU 109.

The CPU 109 checks the information received from the baseband processing unit 105 and the highway interface unit 107. The CPU 109 enables collection of information that indicates the occurrence of a state leading to an increase/replacement related to the CPU 109. The CPU 109 determines the necessity of an increase/decrease or a replacement of the functional blocks with consideration of an apparatus state, at each time point. The CPU 109 has a function of transmitting a determination result through the highway interface unit 107 to the OPE.

Figure 1B:
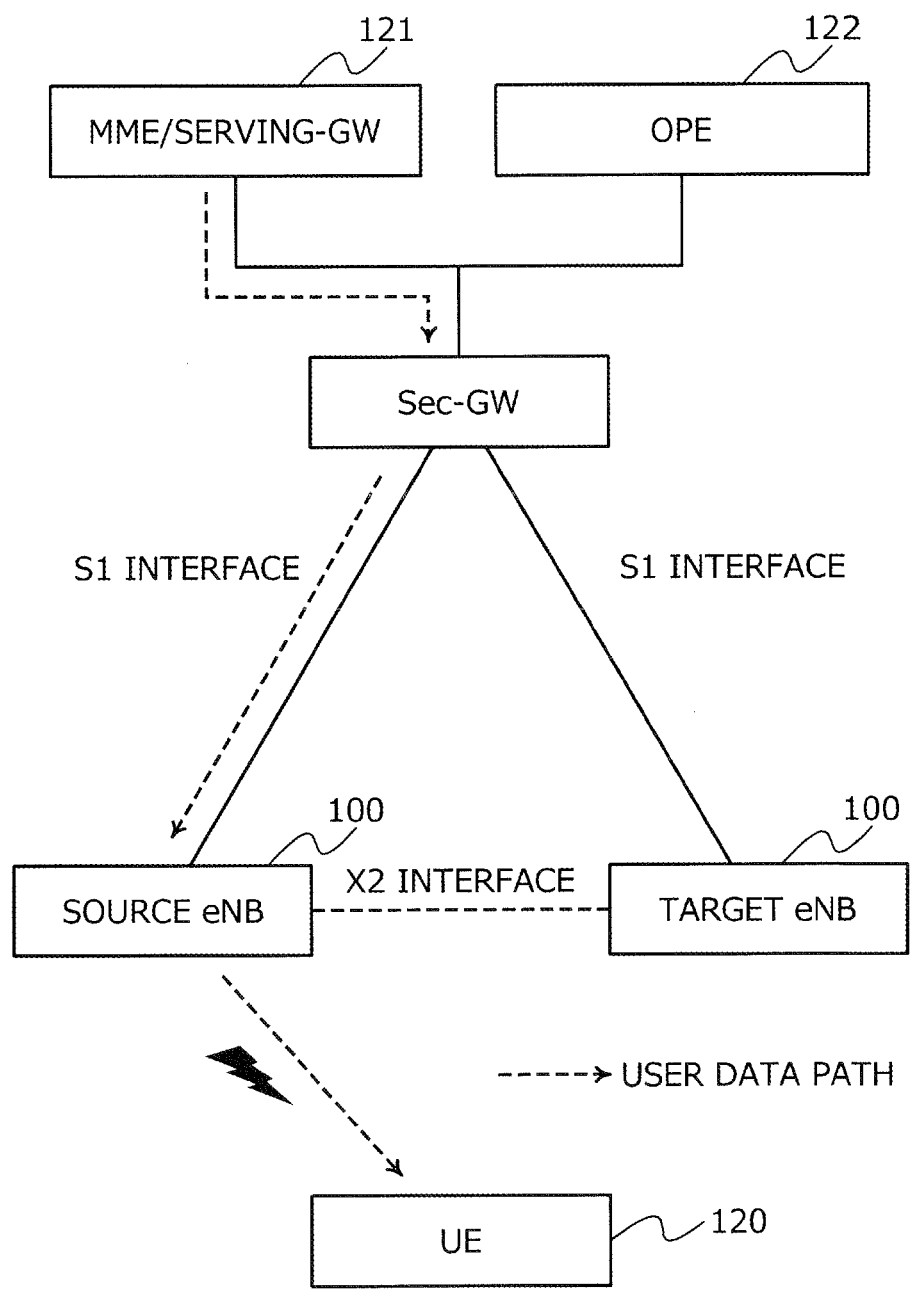
FIG. 1B is a diagram of an overall configuration of a system that includes the base station apparatus.

FIG. 1B is a diagram of an overall configuration of a system that includes the base station apparatus. The configuration will be described by taking a next generation wireless mobile communication system (LTE) as an example. The base station apparatus 100 wirelessly communicates with a mobile station (UE) 120 located in a cell. Communication between the base station apparatuses 100 is performed by establishing interfaces called an S1 interface and an X2 interface. The base station apparatus (eNB) 100 connects to a higher-level apparatus, i.e., an MME/Serving-GW 121 by using the IP protocol. A maintenance terminal (OPE) 122 providing maintenance control to the base station apparatus 100 is connected via the S1 interface.

FIG. 2 is a diagram of an internal configuration example of the baseband processing unit. The baseband processing unit 105 includes a modulation/demodulation processing unit 201, an RLC processing unit 202, a PDCP processing unit 203, a measuring unit 204, and a maintenance/monitoring function unit 205.

The modulation/demodulation processing unit 201 modulates/demodulates data handled for the mobile station (UE) 120 on the wireless side. The radio link control (RLC) processing unit 202 processes RLC messages handled for the mobile station 120. The packet data convergence protocol (PDCP) processing unit 203 processes PDCP messages handled for the mobile station 120. The measuring unit 204 measures the wireless state of communication with the mobile station 120. The maintenance/monitoring function unit 205 performs maintenance/monitoring in the baseband processing unit 105. The maintenance/monitoring function unit 205 monitors the usage rates of the CPU 109 and the common memory 108, and monitors the process status of each functional block (e.g., each of the baseband processing units 105).

FIG. 3 is a diagram of an internal configuration example of the highway interface unit. The highway interface unit 107 includes an IPsec processing unit 301, a stream control transmission protocol (SCTP) processing unit 302, a point-to-point protocol (PPP) processing unit 303, a GPRS tunneling protocol for control plane (GTP-C) processing unit 304, a GPRS tunneling protocol for user plane (GTP-U) processing unit 305, a maintenance/monitoring function unit 306, and an SW 307.

The IPsec processing unit 301 is an encryption function on the IP level and encrypts/decrypts transmission/reception signals for external lines through IPsec (security). The SCTP processing unit 302 manages the SCTP protocol established with external nodes (the MME/Serving-GW 121, the eNB 100). The PPP processing unit 303 manages PPP connection established with a PPP over Ethernet (registered trademark) (PPPoE) server. The PPP processing unit 303 uses the PPP to manage authentication. The GTP-C processing unit 304 manages the GTP-C protocol (for transfer of a control signal) established with the external nodes (the MME/Serving-GW 121, the eNB 100). The GTP-U processing unit 305 manages the GTP-U protocol (for transfer of user data) established with the external nodes (the MME/Serving-GW 121, the eNB 100). The SW 307 is a switch for routing IP packets. The maintenance/monitoring function unit 306 performs maintenance/monitoring in the highway interface unit 107. The maintenance/monitoring function unit 306 monitors the usage rates of the CPU 109 and the common memory 108.

Figure 4:
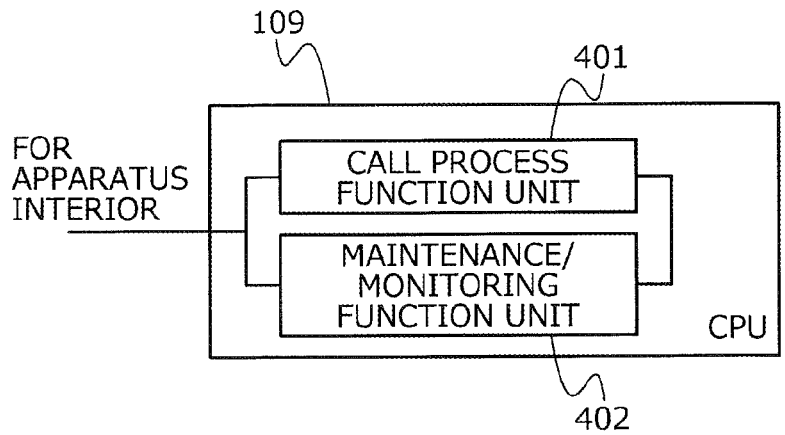
FIG. 4 is a diagram of an internal configuration example of a call processing unit (CPU)

FIG. 4 is a diagram of an internal configuration example of a CPU. The CPU 109 includes a call process function unit 401 and a maintenance/monitoring function unit 402. The call process function unit 401 is a functional unit that executes a call process, manages a cell resource and a common channel resource, and performs allocation, etc. of resources to a user. The maintenance/monitoring function unit 402 performs maintenance/monitoring in the base station apparatus 100. The maintenance/monitoring function unit 402 monitors the usage rates of the CPU 109 and the common memory 108.

Figure 5:
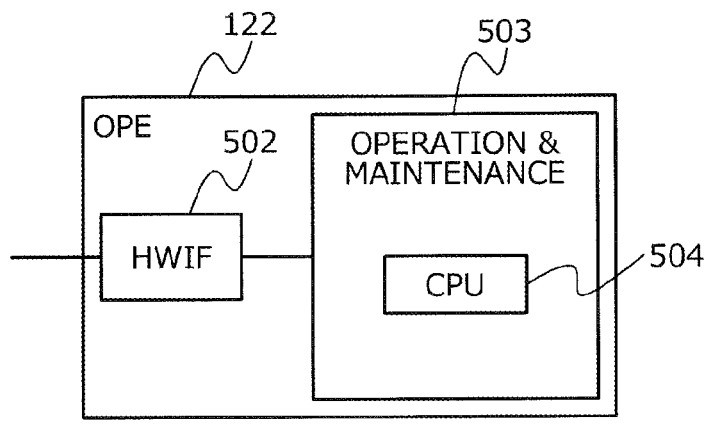
FIG. 5 is a diagram of an internal configuration example of an OPE.

FIG. 5 is a diagram of an internal configuration example of the OPE. The OPE 122 includes an HWIF 502 that communicates with the base station apparatus 100, and a monitoring control unit (Operation and Maintenance) 503 that monitors the base station apparatus 100. The monitoring control unit 503 is functionally processed by the execution of processing by a CPU 504.

Figure 6:
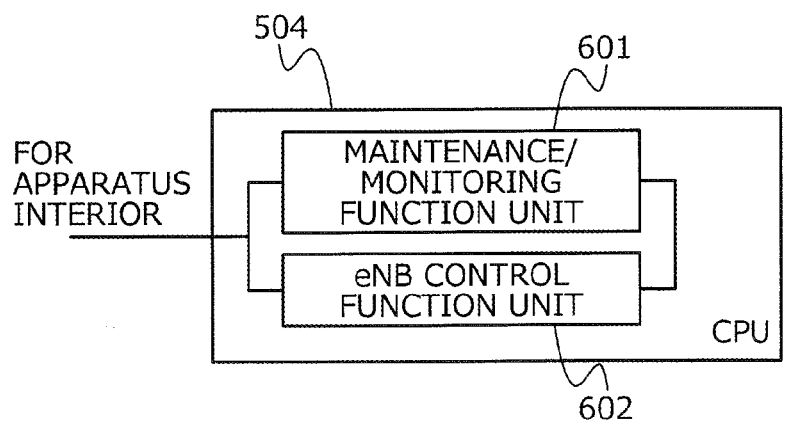
FIG. 6 is a diagram of an internal configuration example of the CPU disposed on the OPE.

FIG. 6 is a diagram of an internal configuration example of the CPU disposed on the OPE. The CPU 504 disposed on the OPE 122 includes a maintenance/monitoring function unit 601 and an eNB control function unit 602. The maintenance/monitoring function unit 601 performs maintenance/monitoring of the base station apparatus (eNB) 100. The eNB control function unit 602 provides control of reset, etc. to the base station apparatus 100 based on the state of the base station apparatus 100 acquired by the maintenance/monitoring function unit 601. The CPU 504 analyzes a message received from the base station apparatus 100 and provides control of notifying a maintenance person of the presence/absence of an increase/decrease/replacement of the functional blocks of the base station apparatus 100.

Figure 7:
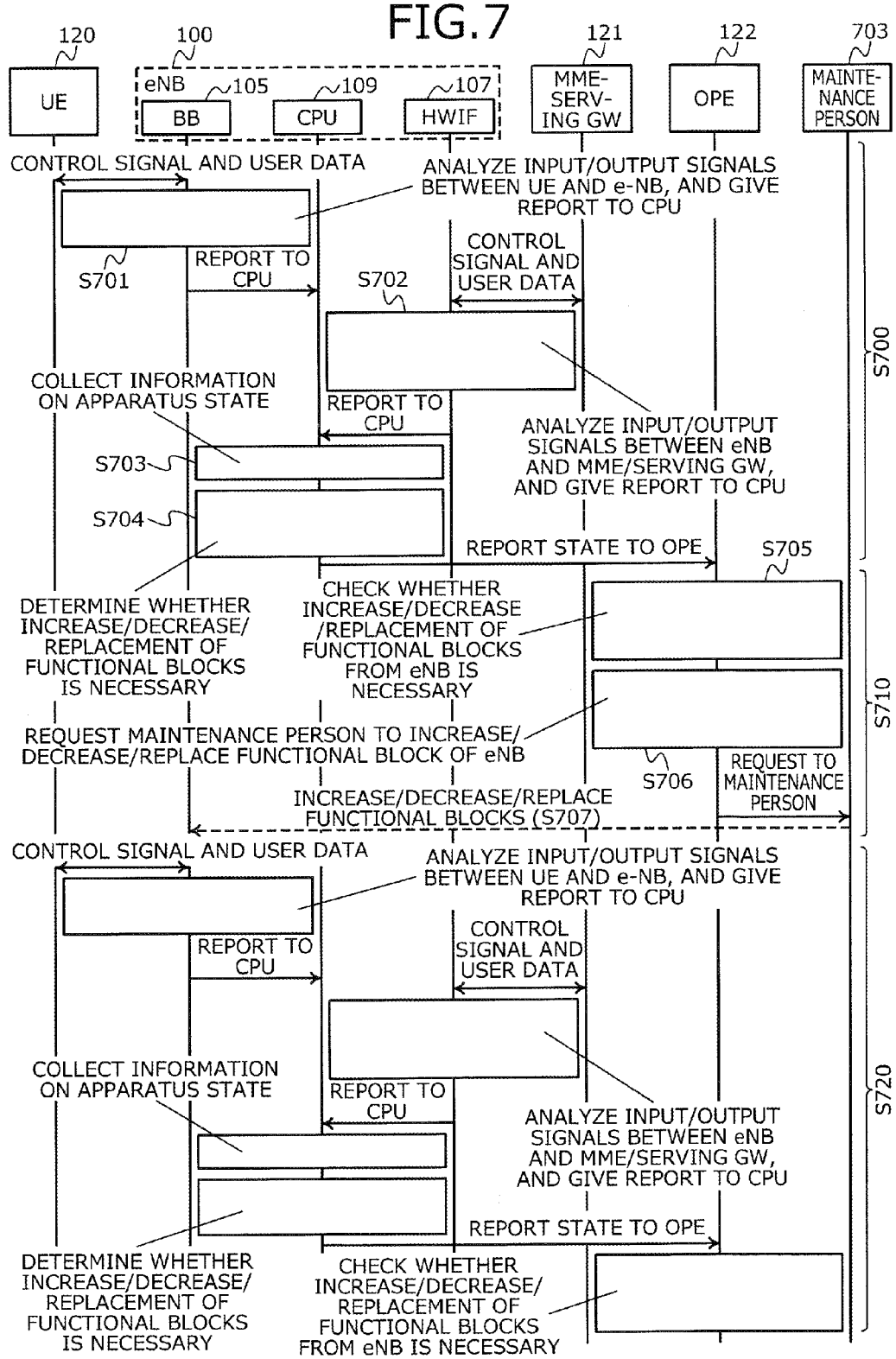
FIG. 7 is a sequence diagram of a process example of maintenance/monitoring control of the base station apparatus.

FIG. 7 is a sequence diagram of a process example of maintenance/monitoring control of the base station apparatus. A process example of the maintenance/monitoring control of the base station apparatus will be described with respect to the constituent elements described above. In FIG. 7, solid lines indicate message transmission/reception between nodes and dotted lines indicate the operation (increase/decrease/replacement of the functional blocks) of the base station apparatus by the maintenance person.

An overview of the maintenance/monitoring control will be described. The base station apparatus 100 checks a control signal/user data that is input from/output to the mobile station (UE) 120 and the MME/Serving-GW 121 and the state of the apparatus (the base station apparatus) 100 to determine whether an increase/decrease/replacement of the functional blocks is necessary (step S700). The OPE 122 makes an operation request to a maintenance person 703 based on requirement information concerning the addition/replacement of the functional blocks in the base station apparatus 100 received from the base station apparatus 100. The maintenance person 703 performs the increase/decrease/replacement of the functional blocks (the CPU 109, the highway interface unit 107, and the baseband processing unit 105, which are insertable and removable like a card) of the base station apparatus 100 (step S710). The base station apparatus 100 then checks a control signal/user data input from/output to the UE 120 and the MME/Serving GW 121 and a state of the apparatus (the base station apparatus) 100 to report that the increase/decrease/replacement of the functional blocks is no longer necessary (step S720).

The maintenance/monitoring control will be described in detail with reference to FIG. 7.

(1. Information Collection in the Base Station Apparatus 100)

The base station apparatus 100 collects information so as to predict whether an increase/replacement of the functional blocks is necessary in the current state. The baseband processing unit 105 analyzes the control signal and the user data transmitted/received between the UE 120 and the base station apparatus 100, and gives a report to the CPU 109 (step S701). The highway interface unit 107 analyzes the control signal and the user data transmitted/received between the base station apparatus 100 and the MME/Serving GW 121, and gives a report to the CPU 109 (step S702). In this case, the following information items (1) to (2) are tabulated.

(1) Wireless/Wired Resource Information Managed in Call Process

The functional blocks executing a call process manage the information depicted in FIG. 8 for managing wireless/wired resource information. FIG. 8 is a chart of call process resources. The resource information includes item number 1: cell resource, item number 2: common channel resource, item number 3: individual channel resource, item number 4: logical channel resource, item number 5: BB measurement resource, item number 6: HWIF resource, etc. The information is calculated from the control signals and the user data transmitted/received between the UE 120 and the base station apparatus 100 and between the base station apparatus 100 and the MME/Serving GW 121. The information depicted in FIG. 8 is information necessary for measuring the processing ability of the base station apparatus 100 at the time of the call process. If the resources become insufficient at the base station apparatus 100, the call setup cannot be performed and the service becomes unavailable.

The information is managed at the base station apparatus 100 with consideration of system bandwidth. FIG. 9 is a chart of cell resource setup information. For example, for item number 1 in the chart, cell resource represents the number of RRC Connected UEs that can be accommodated per cell. The number of the mobile terminals (UEs) 120 capable of being accommodated is determined for each system bandwidth and if the number of the UEs to be accommodated is greater than or equal to the upper limit, notification of a resource shortage is returned.

Although cell resources are basically handled according to cell, the base station apparatus 100 in which a resource pool (CPU management) defined by the OPE 122 has be introduced, may perform the management according to resource pool. Although the number of connected UEs per cell is predetermined in a conventional base station apparatus, if the concept of the resource pool is introduced, the number of UEs connected in a cell can be raised to the number of connected UEs that can be handled in the resource pool. The base station apparatus 100 for which the concept of the resource pool has been introduced, also acquires information that indicates the amount of resources used within the resource pool in terms of parameters.

Similarly, the number of resources capable of being accommodated are predetermined for each system bandwidth/each cell with respect to item number 2: common channel resource, item number 3: individual channel resource, and item number 4: logical channel resource depicted in FIG. 8 and, if the resources to be accommodated are greater than or equal to the upper limits, notification of a resource shortage is returned. With regard to item number 5: BB measurement resource in FIG. 8, the measurable number per measurement item is predetermined and, if measurement greater than or equal to the upper limit is attempted, notification of a resource shortage is returned.

With regard to item number 6: HWIF resource in FIG. 8, the connectable number per protocol is managed. FIG. 10 is a chart of the HWIF resources. The number of associations, the number of concurrent connections, and the number of TE-IDs are managed for each protocol depicted in FIG. 10 and if the upper limits are exceeded, notification of a resource shortage is returned.

(2) Process Status per Functional Block in Baseband Processing Unit

The functional blocks that execute a call process in the base station apparatus 100 normally have a process upper limit for each functional block in addition to the presence/absence of resources of (1). The baseband processing unit 105 collects information that indicates whether this process upper limit is reached. For example, in sub-frames making up a wireless signal, the multiplex number of UEs assigned to one sub-frame in a cell having the sub-frames is dependent on the capacity of hardware making up the BB, and an upper limit exists for the multiplex number. Call setup that exceeds the process upper limits results in the discarding of the corresponding call, etc. and has an impact on the service. Therefore, the base station apparatus 100 has to be operated such that the multiplex number of UEs allocated to one sub-frame does not exceed the upper limit.

For determining statuses other than the call process, the following information is acquired.

(3) Hardware Resource Usage Status Such as CPU Usage Rate/Memory Usage Rate

Usage rates are collected for a CPU and memory disposed in each of the baseband processing unit 105 and the highway interface unit 107. The functional blocks include those operating for the purpose of control such as apparatus monitoring, in addition to the call process. When not so many call processes are in operation, it can be determined that sufficient resources are available from the information collected according to (1) described above; however, if the monitoring control function is frequently operated, a call process cannot be added/set in this situation. In this case, to measure the usage status of the functional blocks, the CPU usage rate and the memory usage rate are used as indexes for making a determination.

(4) Presence/Absence of Inconsistency between Requested Apparatus Configuration and Actual Apparatus Configuration Provisioning data, which is set in advance at the time of operation of the base station apparatus 100 and at the start of the apparatus, defines the number of operational cells/the operational band. If the requested apparatus configuration according to the provisioning data is not consistent with an actual apparatus configuration, the apparatus cannot satisfy the requested function. In the case of a functional block configuration unable to meet the request on the provisioning data, the apparatus performance can be satisfied by additionally implementing a functional block necessary for the apparatus.

(5) Determination on Possibility of Failure due to Component Degradation, Etc.

To enable determination of a possibility of failure due to component degradation, etc., in the baseband processing unit 105, the highway interface unit 107, and the CPU 109, the base station apparatus 100 collects information related to hardware failure such as apparatus temperature/humidity of the base station apparatus 100. A functional block failure causing the functional block replacement may be predicted in advance in some cases. One case is when component degradation can be observed directly and another case is when an environmental change is observed to indirectly observe an effect on the functional blocks.

FIG. 11 is a chart of items enabling advance failure prediction. With regard to item number 1: memory card replacement, the maximum number of times that writing in one block is performed is monitored in a data storage memory card used as the DB 110. With regard to item number 2: free-running frequency stability adjustment, the elapse of a reference clock (OCXO) is monitored. With regard to item number 3: temperature sensing, the possibility of failure is monitored from a reported value of a temperature sensor built into the apparatus. With regard to item number 4: ECC error sensing, the component degradation is monitored from an error count of an ECC function of the internal memory of a DSP and a CPU disposed in the baseband processing unit 105.

Reference of the description returns to FIG. 7. The information among (1) to (5) described above collected by the baseband processing unit 105 and the highway interface unit 107 is reported to the CPU 109 and the CPU 109 collects the state of the apparatus (step S703).

(2. Determination of Increase/Decrease/Replacement of Functional Blocks and Notification to OPE)

Based on the information collected as described in 1. above, the CPU 109 of the base station apparatus 100 determines whether an increase/decrease/replacement of the functional blocks is necessary or unnecessary and gives notification to the OPE along with a coping method (step S704).

The CPU 109 uses the information collected as described in 1. above, and a combination thereof to determine a case of increasing/decreasing/replacing the functional blocks.

Examples of control will be described in terms of a method of combining (1), (2), and (3) described above for determination and a control example of making a comparison with a threshold value in (4) and (5) described above to determine whether a value exceeding the threshold value is detected and notifying the OPE 122 of the optimum maintenance control details.

Figure 12:
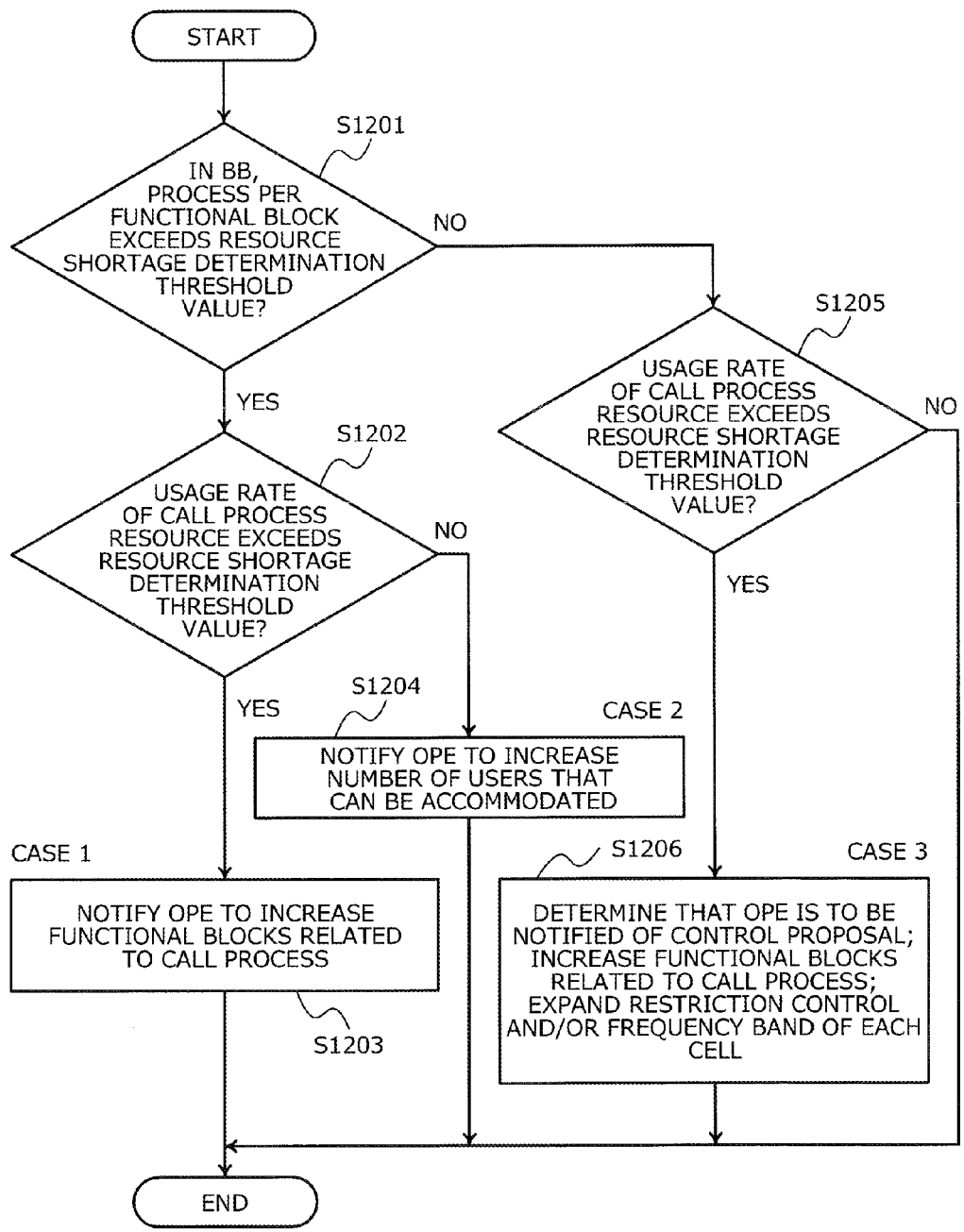
FIG. 12 is a flowchart of an example of control details included in notification given by the CPU.

FIG. 12 is a flowchart of an example of control details included in the notification given by the CPU. If a combination of (1), (2), and (3) is considered, threshold values corresponding to respective parameters are prepared and the determination is made based on whether the threshold values are exceeded. Determination patterns using combinations of (1), (2), and (3) will hereinafter be described.

[Pattern 1]

Determination from Combination of (1) Wireless/Wired Resource Information Managed in Call Process and (2) Process Status per Functional Block in BB Case 1: This is a case when the process per functional block in the baseband processing unit 105 exceeds a resource shortage determination threshold value (step S1201: YES) and the usage rate of the call process resource exceeds a resource shortage determination threshold value (step S1202: YES). In this case, the base station apparatus 100 determines that a high load phenomenon is occurring due to a call process. The CPU 109 notifies the OPE 122 to increase the functional blocks related to the call process (increase of the baseband processing unit 105 is necessary) (step S1203).

Case 2: This is a case when the process per functional block in the baseband processing unit 105 exceeds the resource shortage determination threshold value (step S1201: YES) and the usage rate of the call process resource does not exceed the resource shortage determination threshold value (step S1202: NO). In this case, although the baseband processing unit 105 exhibits a congested state, a usage area is still available for the call process resource and therefore, it is determined that a temporary congested state is occurring in a cell managed by the baseband processing unit 105 (UEs are concentrated in one place because of an event or due to traffic congestion). The CPU 109 notifies the OPE 122 to expand restriction control and a frequency band of each cell to increase the number of users that can be accommodated rather than increasing the functional blocks related to the call process (the baseband processing unit 105) (step S1204).

Case 3: This is a case when the process per functional block in the baseband processing unit 105 does not exceed the resource shortage determination threshold value (step S1201: NO) and the usage rate of the call process resource exceeds the resource shortage determination threshold value (step S1205: YES). In this case, the base station apparatus 100 determines that the number of registered users is increasing. The OPE 122 is notified to increase the functional blocks related to the call process (the baseband processing unit 105) or to expand restriction control and a frequency band of each cell to increase the number of users that can be accommodated (step S1206).

If the process per functional block in the baseband processing unit 105 does not exceed the resource shortage determination threshold value (step S1201: NO) and the usage rate of the call process resource does not exceed the resource shortage determination threshold value (step S1205: YES), the process is terminated without giving notification to the OPE 122.

Figure 13:
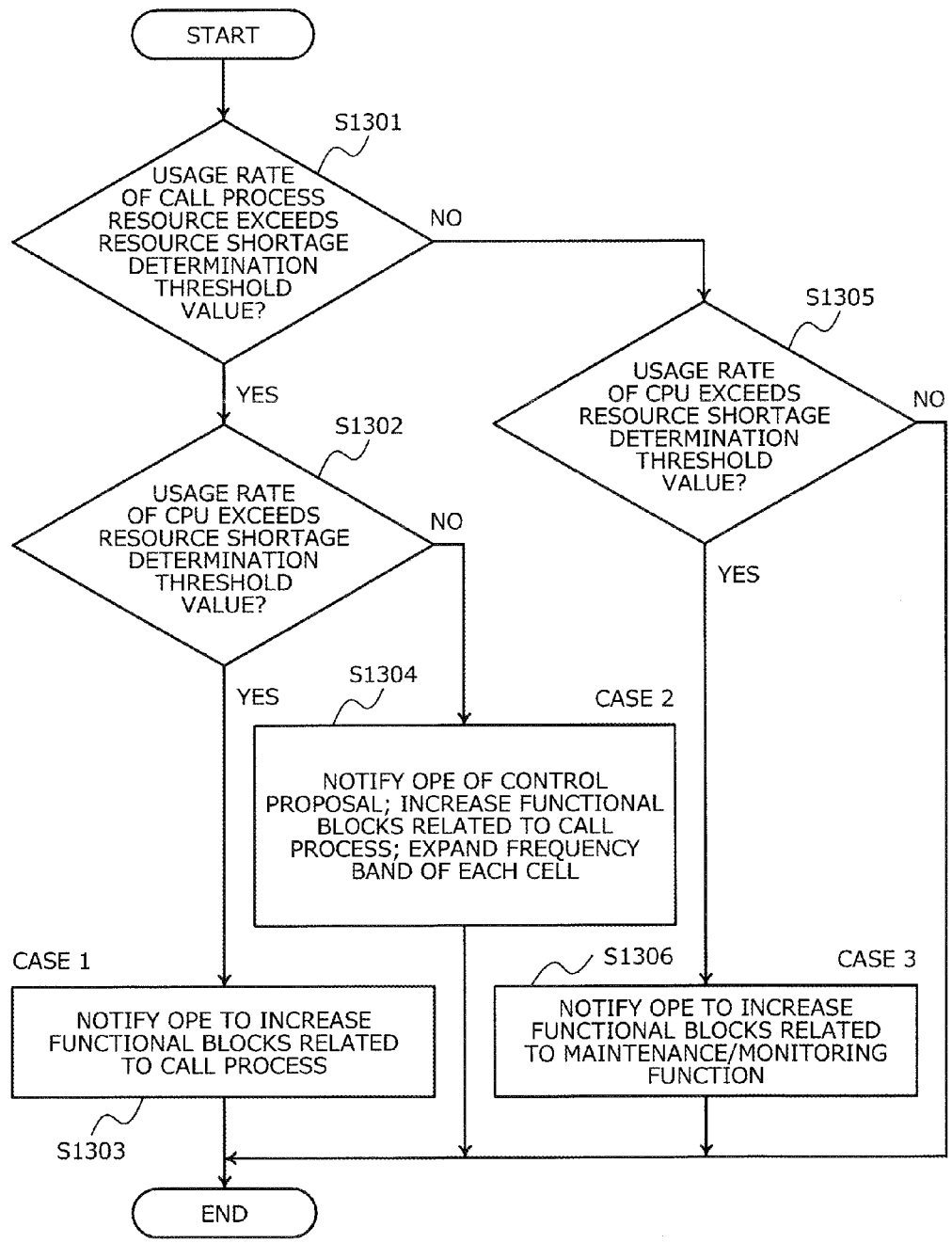
FIG. 13 is a flowchart of another example of the control details included in the notification provided by the CPU.

FIG. 13 is a flowchart of another example of the control details included in the notification provided by the CPU.

[Pattern 2]

Determination from Combination of (1) Wireless/Wired Resource Information Managed in Call Process and (3) Hardware Resource Usage Status such as CPU Usage Rate/Memory Usage Rate Case 1: This is a case where the usage rate of the call process resource exceeds a resource shortage determination threshold value (step S1301: YES) and the usage rate of the CPU 109 exceeds a resource shortage determination threshold value (step S1302: YES). In this case, the base station apparatus 100 determines that a high load phenomenon is occurring due to a call process. The OPE 122 is notified to increase the functional blocks related to the call process (the baseband processing unit 105) (step S1303).

Case 2: This is a case where the usage rate of the call process resource exceeds the resource shortage determination threshold value (step S1301: YES) and the usage rate of the CPU 109 does not exceed the resource shortage determination threshold value (step S1302: NO). In this case, despite the number of registered users increasing, a large-volume service such as video transfer is not provided and therefore, the base station apparatus 100 determines that the situation can be supported by simply adding cell resources (adding the number of accommodated users). The CPU 109 notifies the OPE 122 to increase the functional blocks related to the call process (the baseband processing unit 105) or to expand a frequency band of each cell to increase the number of users that can be accommodated (step S1304).

Case 3: This is a case where the usage rate of the call process resource does not exceed the resource shortage determination threshold value (step S1301: NO) and the usage rate of the CPU 109 exceeds the resource shortage determination threshold value (step S1305: YES). In this case, the base station apparatus 100 determines that a high load is occurring in a maintenance/monitoring function (e.g., file creation for monitoring) other than the call process. The CPU 109 notifies the OPE 122 to increase the functional blocks related to the maintenance/monitoring function (such as the CPU 109) (step S1306).

If the usage rate of the call process resource does not exceed the resource shortage determination threshold value (step S1301: NO) and the CPU usage rate does not exceed the resource shortage determination threshold value (step S1305: NO), the process is terminated without giving notification to the OPE 122.

If the usage rate of the call process resource and the CPU usage rate are determined among the parameters used in the patterns 1 and 2, a comparison is made with the threshold values held in the base station apparatus 100 to determine whether the rate/usage rate is high or low. Since the increase/decrease and replacement of the functional blocks has to be performed without suspending the service (communication), the threshold values are set to values sufficiently lower than the values at which the service is terminated in the base station apparatus 100. For example, if the threshold value of the CPU usage rate is 100%, a process can no longer be added in this state, which causes the termination of the service, and therefore, the threshold value is set to 50% etc., such that the threshold value is set to a value allowing a margin for the process. These threshold values can be set freely according to the policy of the carrier, using the technique of the embodiment.

If the patterns described above are not applicable in the base station apparatus 100, not even once, for a predetermined period, the base station apparatus may determine that a processing card increase is unnecessary and that the processing ability has a margin. In this state, if the functional blocks are redundantly implemented in the base station apparatus 100, it can be determined from this information that the functional blocks can be reduced.

With regard to (4) and (5) described above, the CPU 109 uses threshold values to make a determination and determines the increase/decrease/replacement of the functional blocks.

(4) If Requested Apparatus Configuration is not Consistent with Actual Apparatus Configuration The CPU 109 determines whether the actual configuration of the base station apparatus 100 coincides based on the requested apparatus configuration from the provisioning data. If the functional block configuration cannot meet the request by the provisioning data, the necessary functional blocks can be added to the base station apparatus 100 to satisfy the apparatus performance. The CPU 109 notifies the OPE 122 to add the necessary functional blocks.

(5) If Replacement of Functional Block is Necessary due to Component Degradation The CPU 109 has threshold values for determining a possibility of failure and uses the respective predetermined thresholds for the items of the possibility of failure depicted in FIG. 11 to make a determination. If the threshold value for each of the items is exceeded, the CPU 109 determines that the possibility of failure exists due to deterioration in durability and notifies the OPE 122 to replace the relevant functional block.

For example, with regard to item number 1: memory card replacement, the determination using the threshold value is made by determining whether the maximum number of times that writing in one block of the data storage memory card (DB 110) is performed exceeds the threshold value held in the apparatus. With regard to item number 2: free-running frequency stability adjustment, it is determined whether a period of a threshold value of the apparatus has elapsed since an adjustment of frequency stability for the OCXO. With regard to item number 3: temperature sensing, the temperature in the base station apparatus 100 is monitored for a certain period and if the temperature specified as the threshold value in the apparatus is recorded for the number of times specified in the apparatus, it is determined that failure may occur. With regard to item number 4: ECC error sensing, if a constant value is continuously exceeded in terms of the number of times of ECC correction per unit time in the internal memory of the DSP or the CPU, component deterioration is determined.

In (4) and (5), the CPU 109 may have a lower limit threshold value in addition to the upper limit threshold value. If it is determined that the collected value falls below the lower limit threshold value, the corresponding functional block is considered as having an ability higher than the necessary processing ability. If the functional blocks are redundantly implemented, the functional blocks can be reduced based on this information.

Figure 14:
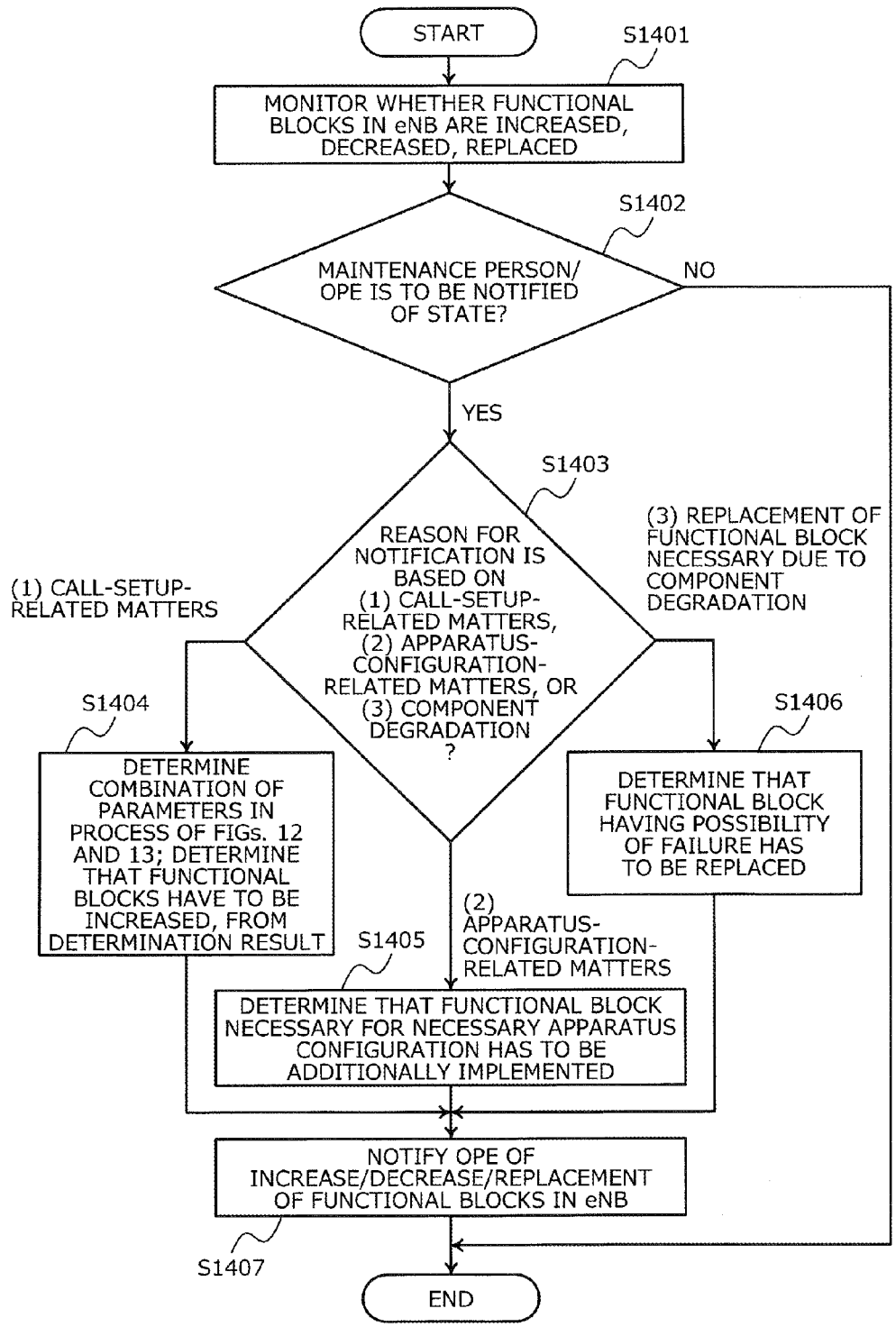
FIG. 14 is a flowchart of a determination process of notification from the base station apparatus to the OPE.

FIG. 14 is a flowchart of a determination process of notification from the base station apparatus to the OPE. FIG. 14 depicts the process contents of notification to the OPE 122 executed by the CPU 109 of the base station apparatus 100 described above. First, in the base station apparatus 100, the CPU 109 monitors the state of the functional blocks (step S1401). The CPU 109 determines whether the maintenance person/the OPE 122 is to be notified of the state (step S1402).

If the maintenance person/the OPE 122 is to be notified of the state (step S1402: YES), the CPU 109 determines whether of the reason for notification is based on (1) call-setup-related matters, (2) apparatus-configuration-related matters, or (3) component degradation (step S1403). In the case of (1) call-setup-related matters (step S1403: (1)), a combination of the parameters is determined in the process of FIGS. 12 and 13 to determine that the functional blocks has to be increased from the determination result (step S1404) and the process proceeds to step S1407. If the maintenance person/the OPE 122 do not have to be notified of the state (step S1402: NO), the process is terminated.

In the case of (2) apparatus-configuration-related matters (step S1403: (2)), it is determined that the functional block necessary for the necessary apparatus configuration has to be additionally implemented (step S1405), and the process proceeds to step S1407. If a functional block has to be replaced due to (3) component degradation (step S1403: (3)), it is determined that the functional block having the possibility of failure has to be replaced (step S1406), and the process proceeds to step S1407.

At step S1407, the base station apparatus 100 notifies the OPE 122 of the increase/decrease/replacement of the functional blocks (step S1407), and terminates the process.

(3. Process of OPE)

The reference of the description returns to FIG. 7. The OPE 122 acquires the information from the base station apparatus 100 and checks whether an increase/decrease/replacement of the functional blocks is necessary according to the base station apparatus 100 (step S705). If an increase/decrease/replacement of the functional blocks is necessary, the OPE 122 accordingly makes a request to the maintenance person 703 (step S706).

FIG. 15 is a flowchart of process contents of control provided by the OPE. First, the OPE 122 acquires the state of the base station apparatus 100 from the base station apparatus 100 (step S1501). The OPE 122 determines based on the acquired state of the base station apparatus 100, whether maintenance control has to be provided to the base station apparatus 100 (step S1502). If maintenance control is to be provided to the base station apparatus 100 (step S1502: YES), contents of control are determined (step S1503). On the other hand, if it is not necessary to provide maintenance control to the base station apparatus 100 (step S1502: NO), the process is terminated.

At step S1503, the contents of control are selected from among (1) reset, (2) block, and (3) alarm (ALM) (step S1503). In the case of (1) reset (step S1503: (1)), if the notification contents from the base station apparatus 100 indicate an abnormal value, etc., the relevant functional block is reset and initialized (step S1504). In the case of (2) block (step S1503: (2)), the relevant functional block is put into a blocked state based on the notification contents from the base station apparatus 100 to suspend the function (step S1505). Subsequently, the corresponding functional block is increased or replaced. In the case of (3) alarm (step S1503: (3)), the relevant functional block is determined as an alarm (ALM) based on the notification contents from the base station apparatus 100 and is handled as having a failure (step S1506). Subsequently, replacement, etc. is performed for the corresponding functional block.

(4. Increase/Decrease/Replacement Operation of Functional Blocks by Maintenance Person)

The reference of the description returns to FIG. 7. The maintenance person 703 increases/decreases/replaces the functional blocks in the base station apparatus 100 based on the contents of the notification from the OPE 122 (step S707).

(5. Monitoring after Increase/Decrease/Replacement of Functional Blocks)

The base station apparatus 100 collects information as is the case at step S70, to determine whether circumstances call for an increase/replacement of the functional blocks again (step S720). The functional blocks increased/decreased/replaced by the maintenance person operate without exceeding the threshold values of the CPU 109. Therefore, for a predetermined period after the functional blocks have been increased/decreased/replaced, the base station apparatus 100 notifies the OPE 122 that the increase/decrease/replacement of the functional blocks is not necessary. After the predetermined period elapses, if the state of the base station apparatus 100 subsequently changes to a state in which the increase/decrease/replacement of the functional blocks is necessary, the base station apparatus 100 again notifies the OPE 122 to increase/decrease/replace the functional blocks.

According to the embodiment described above, the base station apparatus monitors input/output control signals and user data as well as the state of the apparatus to determine whether an increase/decrease/replacement of the functional blocks is necessary, and notifies the OPE of a necessity to increase/decrease/replace functional blocks. As a result, the functional blocks can be increase/decrease/replaced before the occurrence of a resource shortage or device failure. Therefore, the termination of operation of the base station apparatus can be prevented.

Since the base station apparatus monitors input/output control signals and user data as well as the state of the apparatus to determine whether an increase/decrease/replacement of the functional blocks is necessary, the base station apparatus does not impart network load associated with the sending of data to the network between the OPE and the base station apparatus. Since advance failure prediction is performed for predetermined items, a failure can be prevent in advance so as to suppress the effect on service.

The control method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an embodiment, a base station apparatus collects and analyzes information concerning a state change thereof to achieve continuous service.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station apparatus comprising:
   a plurality of functional blocks that are made up of hardware and formed according to function, and include functional blocks related to a call process; and
   a processor configured to:
   determine to increase the functional blocks related to the call process, when a process per functional block exceeds a first threshold value and a usage rate of call process resource exceeds a second threshold value; and
   output a determination result to an external destination.

2. The base station apparatus according to claim 1, wherein
   the processor determines based on resource information of the call process and a process status of each functional block related to the call process, to increase, decrease, or replace the functional blocks related to the call process.

3. The base station apparatus according to claim 1, wherein
   the processor determines based on resource information of the call process and a hardware resource usage status of the processor, to increase, decrease, or replace the functional blocks related to the call process or to the processor.

4. The base station apparatus according to claim 1, wherein the processor determines durability of each component included in the functional blocks by using a threshold value, and the processor determines that a possibility of failure exists for a component that reaches the threshold value.

5. The base station apparatus according to claim 2, wherein the processor acquires, as the resource information of the call process, one or a plurality of combinations of a cell resource, a common channel resource, an individual channel resource, a logical channel resource, a baseband measurement resource, and a highway interface resource.

6. The base station apparatus according to claim 3, wherein the processor acquires, as the resource information of the call process, one or a plurality of combinations of a cell resource, a common channel resource, an individual channel resource, a logical channel resource, a baseband measurement resource, and a highway interface resource.

7. A base station control method of a base station apparatus having a plurality of functional blocks that are made up of hardware and formed according to function and include functional blocks related to a call process, the base station control method comprising:
   determining to increase the functional blocks related to the call process, when a process per functional block exceeds a first threshold value and a usage rate of call process resource exceeds a second threshold value; and
   outputting a determination result to an external destination.

8. A base station control system comprising:
   a base station apparatus; and
   a maintenance terminal, wherein
   the base station apparatus includes:
   a plurality of functional blocks that are made up of hardware and formed according to function, and include functional blocks related to a call process, and
   a processor configured to:
   determine to increase the functional blocks related to the call process, when a process per functional block exceeds a first threshold value and a usage rate of call process resource exceeds a second threshold value; and output a determination result to the maintenance terminal, and the maintenance terminal determines based on the determination result output from the base station apparatus, whether maintenance control for the base station apparatus is to be provided and provides the maintenance control accordingly.

9. The base station control system according to claim 8, wherein the maintenance terminal provides the maintenance control of reset, block, or a failure alarm for a corresponding functional block of the base station apparatus, based on the determination result output from the base station apparatus.

* * * * *